Aug. 8, 1939.  C. S. REED  2,169,197
SEAT STRUCTURE
Filed Dec. 9, 1935  3 Sheets-Sheet 1

Inventor
Clair S. Reed
By Beaman & Langford
Attorney

Aug. 8, 1939. C. S. REED 2,169,197
SEAT STRUCTURE
Filed Dec. 9, 1935 3 Sheets-Sheet 2
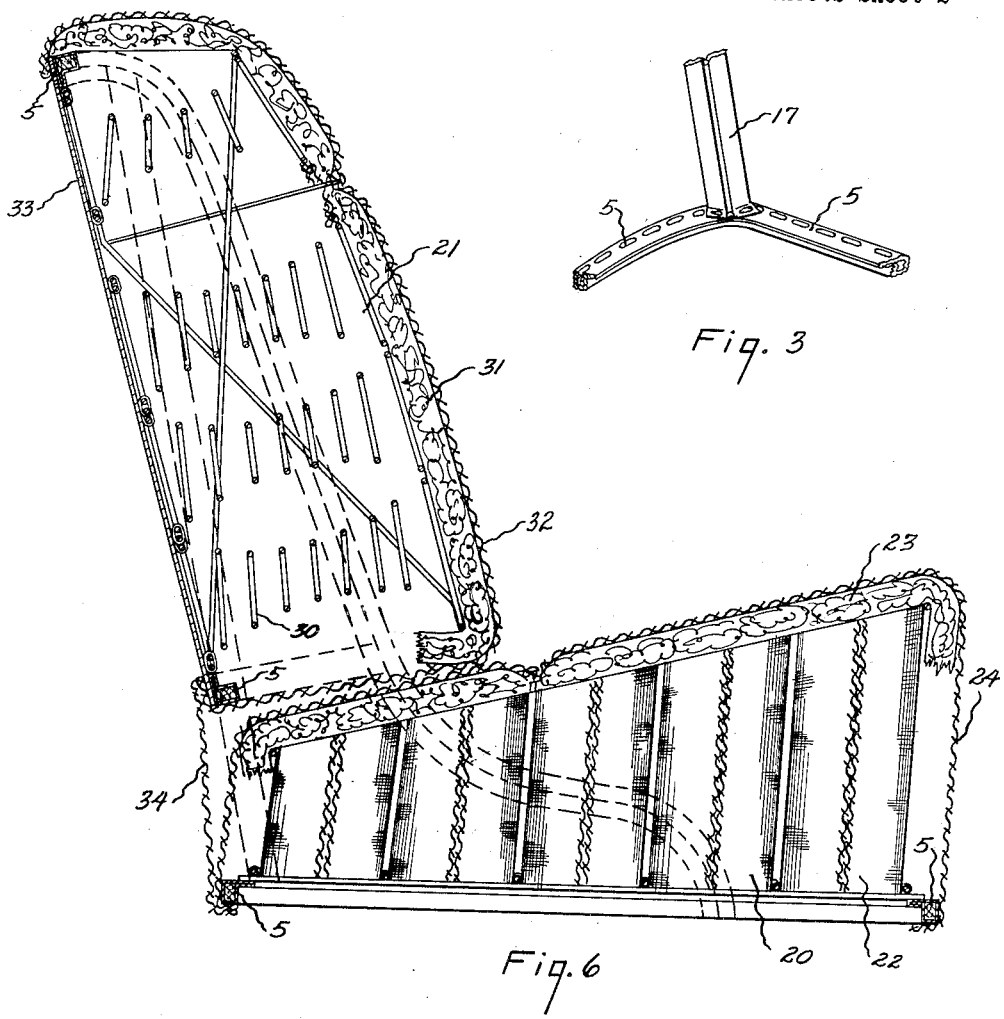
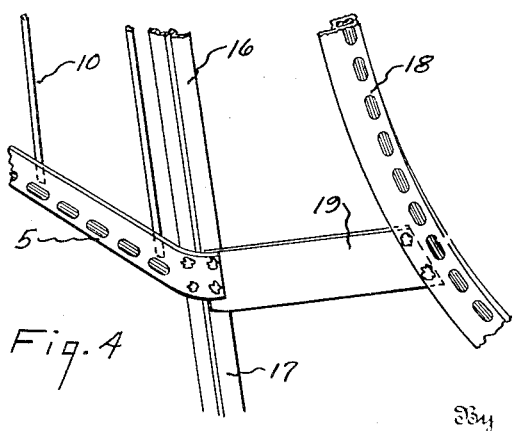
Inventor
Clair S. Reed
Beaman & Langford
Attorney Patented Aug. 8, 1939

2,169,197

UNITED STATES PATENT OFFICE 2,169,197

SEAT STRUCTURE

Clair S. Reed, Jackson, Mich., assignor to Reynolds Spring Company, Jackson, Mich., a corporation of Delaware Application December 9, 1935, Serial No. 53,537

3 Claims. (Cl. 155—5)

This invention relates to seat structures and more particularly to a unitary framework for receiving cushion springs and upholstery in automotive vehicle seats and furniture.

Recent commercial constructions for receiving the cushion springs in automotive vehicle seats and furniture have comprised heavy, bulky frameworks constructed of wood and sheet metal. The wood framework was used not only for providing bodily strength but also because it provided a tacking surface. The present invention overcoming the bulkiness and weight of the prior structures and yet retaining its advantages of strength and its tacking surface, consists of a framework for the bottom and back cushion springs made of a novel composite structural border member and transverse members, the result being an inexpensive, light weight and practical construction. It is particularly useful for front seats in automotive vehicles which are adjustable relative to the dash but it is not limited to this use.

An object of the invention is to eliminate the conventional heavy sheet metal and wood framework by providing a light metal framework designed to have the back and seat cushion springs built into the framework, the entire structure to be upholstered as a unit.

Another object of the invention is to provide a seat structure bordered by a novel rolled composite structural member formed to give the proper contour to the construction.

A further object of the invention is to provide a novel tacking strip comprised of substantially hollow perforated sheet metal having a suitable tack receiving filler, and an extending flange providing stiffening and a support to which other members may be welded or otherwise suitably secured.

Figure 1:
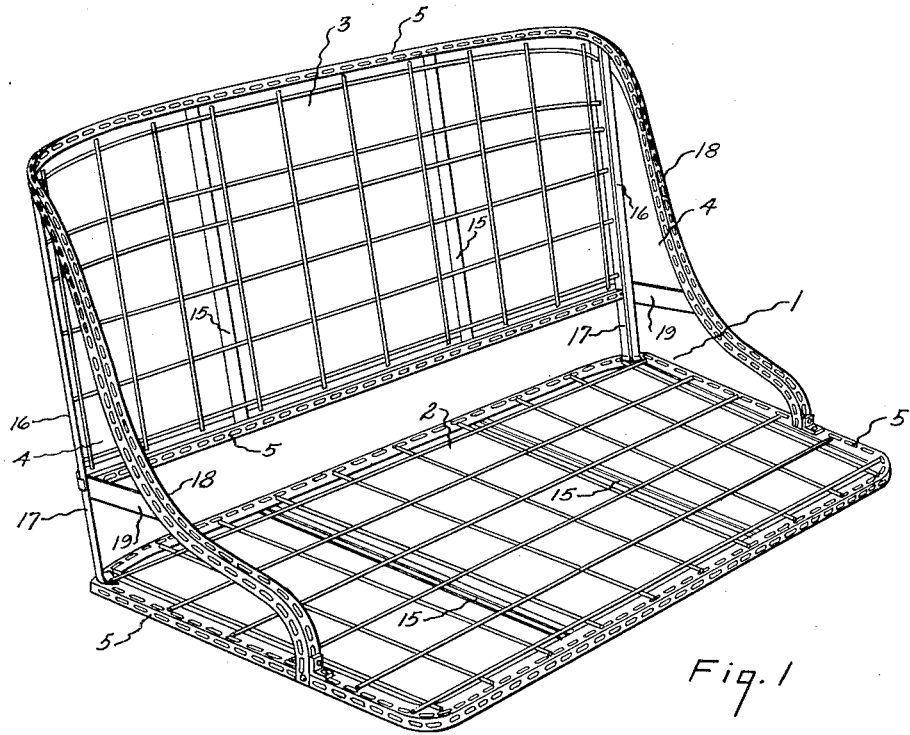
Figure 2:
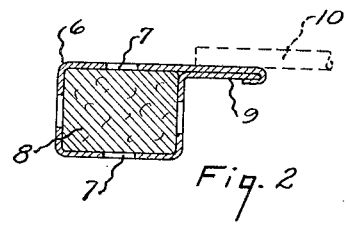
Figure 5:
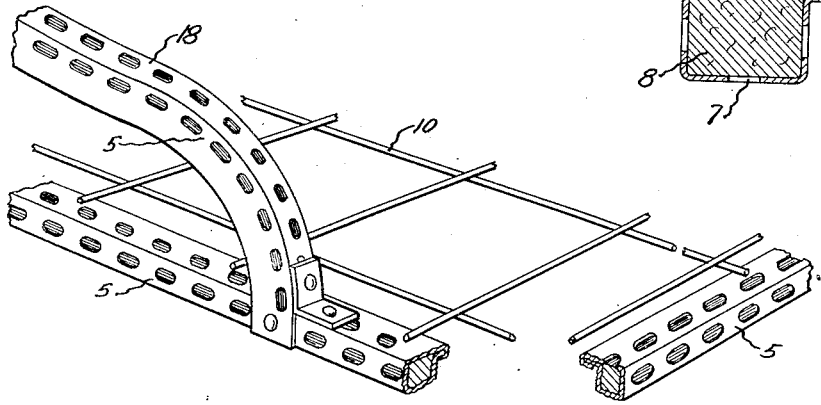
Figure 7:
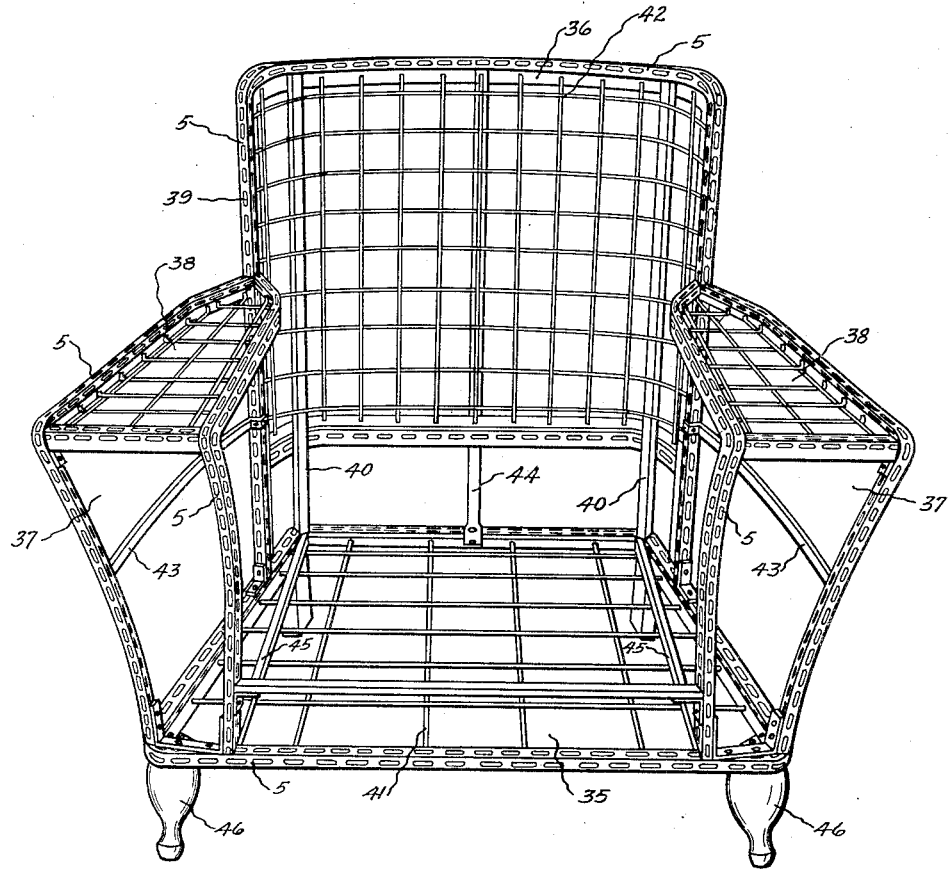

These and other objects will be apparent from the following specification when taken with the accompanying drawings in which:

Fig. 1 is a perspective view of a vehicle seat framework disclosing the bottom, back and side frames, Fig. 2 is a cross section of the tacking strip, Figs. 3, 4 and 5 disclose enlarged details of various portions of the assembled framework of Fig. 1, Fig. 6 is a vertical section of the framework of Fig. 1 having cushion springs built therein, the entire unit being upholstered, and Fig. 7 is a perspective view of a chair frame.

Referring particularly to Fig. 1 of the drawings the frame 1 for receiving spring cushions is composed entirely of metal. The frame 1 consists broadly of a bottom frame 2, back frame 3 and side frames 4. Each of the frames comprises, as a structural part thereof, a composite member 5 defining the contour of said frame and providing surfaces to which upholstery may be tacked in the well known manner. The member 5 is shown particularly in cross section in Fig. 2 and comprises a rolled sheet metal tubular member 6 having on each side thereof rows of perforations 7. Within the tubular member 6 is disposed a wood, fiber or other usual tack receiving filling 8. It will be obvious that tacks passing through the perforations 7 may be driven into the filling 8 in the usual manner.

As shown particularly in Fig. 2 the edges of the sheet metal forming the tubing 6 are brought together at one corner of the tubing 6 and extend in parallel contacting relation one end overlapping the end of the other to secure the two edges together providing a flange 9. The flange 9 may have the flat configuration shown or some other. The purpose of the flange 9 is essentially twofold. It stiffens the member 5 and, of course, thereby the entire frame 1. Furthermore, the flange 9 provides a ledge to which are secured spaced crossed wires 10 forming cushion spring supports. The wires 10 are preferably spot welded to the flanges 9 and to each other at their intersections. The specific crossed wires disclosed are not essential to the invention it being understood that other suitable cushion spring supports might be used and supported by and secured to the flanges 9. In addition to the crossed wire structure both the bottom and back frames 2 and 3 are provided with relatively heavy intermediate bars 15 for the purpose of strengthening the respective frames and providing intermediate supports for the crossed wire structure.

The back frame 3 has side pieces 16, roughly in the form of T-bars for rigidity, which are extended downwardly providing legs 17 suitably secured to the back corners of the bottom frame 2 as shown in Fig. 3. The section of the member 5 constituting the top edge of the back frame 3 is extended downwardly and forwardly on each side providing arms 18 which are respectively connected in a suitable manner to the tacking strips 5 constituting sides of the bottom frame 2. Intermediate support is given to the arms 18 by the tying bars 19 connecting the arms 18 with the sides 16 of the back frame 3 at the junctions of the tacking strip 5 constituting the bottom edge of the back frame 3. Fig. 4 discloses an enlarged detail of the tying bar 19 and its connections to the back frame 3 and the arm 18, and Fig. 5 discloses an enlarged detail of the connection of an arm 18 with a side of the bottom frame 2.

After the front, back and side frames, as disclosed in Fig. 1, have been assembled, cushion springs 20 and 21 are mounted on the bottom frame 2 and the back frame 3, respectively. The cushion spring 20 is of any suitable design having and including fabric encased coil springs 22 of the "Marshall" type, padding 23 and an enclosing cover 24 tacked to the member 5 comprising the border of the bottom frame. The cushion spring 21 includes coil springs 30, padding 31 and a cover 32 suitably secured to the member 5 of the back frame 3. The back is enclosed with a suitable panel 33. An additional cover 34 is provided filling in the space between the bottom of the back frame 3 and the bottom frame 2.

The specific cushion springs 20 and 21 of Fig. 6 and the specific method of securing them to the respective frames are not included by the present invention but are merely disclosed for the purpose of illustrating the use of the frame structure which constitutes the invention, and the completed construction. The present invention has particular utility in front seats for automotive vehicles which are mounted for adjustment relative to the dash board of the vehicle. However, it is not intended that the invention be so limited for it also has application in the back seats of automotive vehicles and in furniture.

An illustration of an article of furniture which may be constructed in accordance with the present invention is disclosed in Fig. 7. As will be obvious the construction of Fig. 7 is very similar to that of the vehicle seat frame disclosed in Fig. 1. There are provided a bottom frame 35, a back frame 36 and side frames 37, each of the frames being substantially bordered by sections of the composite member 5. The side frames 37 are in effect arm frames and in the form disclosed are provided with crossed wire structures 38 on which, if desired, may be mounted spring cushion structures. The arms, however, need not be as illustrated but may take other forms depending on the type of chair desired. In addition to serving as arms the side frames also serve as supports bracing the bottom frame 35 and the back frame 36 one from the other.

Supplementary side frames 39 defined by the vertically disposed sections of the member 5 adjacent the back frame 36, and the supporting bars 40 not only serve to provide a desired shape but also provide rigidity and support for the back frame 36 with respect to the bottom frame 35. The bottom frame 35 and the back frame 36 are provided with crossed wire structures 41 and 42, respectively, and the entire framework is provided with such bracing members as may be desired as for instance 43, 44 and 45. In this embodiment of the invention as well as that of Fig. 1 the crossed wire structures, namely, 38, 41 and 42 are spot welded or otherwise suitably secured to the flanges 9 of the sections of the member 5. The chair is completed by mounting the framework on appropriate legs 46, mounting cushion springs on the bottom frame 35 and the back frame 36, and upholstering.

It will be observed that the invention provides a simple light weight structure for replacing the bulky, heavy, wood and sheet metal framework heretofore used for similar purposes. The invention also includes the construction of the composite sheet metal and fibrous structural member 5 offering tacking surfaces in relatively disposed planes, the flange of which not only provides a desirable degree of stiffening but also provides a portion to which the cushion spring supports may be readily spot welded, or otherwise suitably secured.

Having thus described my invention what I desire to claim and secure by Letters Patent is:

1. A light weight seat frame for automobiles, furniture and the like, comprising a horizontal bottom framework and a vertical back framework, means for rigidly maintaining said frameworks in definite spaced relation, said frameworks being defined by border structural frame members and transverse frame members extending between the sides of said border members, said border frame members comprising elongated sheet metal and twisted paper strips rolled one upon the other, the major portion of the width of said sheet metal strip juxtaposed upon the surface of said paper strip, said twisted paper strip being exposed to receive tacks in the upholstering of said seat frame, both said paper strip and metal strip being relatively rigid so as to provide a light yet relatively rigid composite structural member, said composite member in cross-section being of substantially equal horizontal and vertical dimension so as to give sufficient rigidity of support to loads supported by the seat frame during use, the cross-section of said composite member being such as to enable the same to be shaped through substantially 90° to provide corners for said border frame from continuous sections of said composite member and to permit the same to be readily shaped to provide any desired contour of the seat frame.

2. A front seat frame for automobiles comprising a substantially rectangular bottom frame upon which the seat springs of the cushion are adapted to be directly supported, said bottom frame having a border comprising a continuous composite structural member of rolled sheet metal and fibrous material, a back frame comprising metal vertical columns anchored at the lower ends to said bottom frame, a second similar continuous composite structural member fastened at its opposite ends to the opposite sides of said bottom frame extending upwardly and rearwardly to define side frames with the intermediate section thereof constituting the upper border of said back frame, a third similar continuous composite structural member forming the lower edge of said back frame, metal rods supported from said composite members defining said back and bottom frames to form a reticular framework for said back and bottom frames, to impart rigidity thereto and to provide supporting surfaces for the back and seat cushions, the fibrous material of said composite members being exposed at intervals to receive fastening instrumentalities during the upholstering of said seat frame.

3. A front seat frame for automobiles, comprising a substantially rectangular bottom frame upon which the seat frame of the cushions are adapted to be directly supported, a back frame including vertical columns anchored at their lower ends to said bottom frame, a frame fastened at its opposite ends to the opposite sides of said bottom frame extending upwardly and rearwardly, the intermediate section thereof constituting the upper border of said back frame, a member forming the lower edge of said back frame, metal rods supported from said back and bottom frame to form a reticular framework for said back and bottom frame to impart rigidity thereto and to provide supporting surfaces for the back and seat cushions.

CLAIR S. REED.